N. TROYER.
CAN HEADING MACHINE.
APPLICATION FILED MAY 1, 1914.

1,209,233.

Patented Dec. 19, 1916.
7 SHEETS—SHEET 1.

WITNESSES:

INVENTOR
Nelson Troyer
BY
ATTORNEY

N. TROYER.
CAN HEADING MACHINE.
APPLICATION FILED MAY 1, 1914.

1,209,233.

Patented Dec. 19, 1916.
7 SHEETS—SHEET 5.

WITNESSES:
B. M. Hartman
V. C. Hess

INVENTOR
Nelson Troyer
BY
ATTORNEY

N. TROYER.
CAN HEADING MACHINE.
APPLICATION FILED MAY 1, 1914.

1,209,233.

Patented Dec. 19, 1916.
7 SHEETS—SHEET 6.

WITNESSES:
B. M. Hartman
V. C. Hess

INVENTOR
Nelson Troyer
BY
ATTORNEY

N. TROYER.
CAN HEADING MACHINE.
APPLICATION FILED MAY 1, 1914.

1,209,233.

Patented Dec. 19, 1916.
7 SHEETS—SHEET 7.

WITNESSES:
B. M. Hartman
J. C. Hess

INVENTOR
Nelson Troyer
BY
ATTORNEY

UNITED STATES PATENT OFFICE.

NELSON TROYER, OF SEATTLE, WASHINGTON, ASSIGNOR TO SEATTLE ASTORIA IRON WORKS, OF SEATTLE, WASHINGTON, A CORPORATION OF WASHINGTON.

CAN-HEADING MACHINE.

1,209,233.  Specification of Letters Patent.  Patented Dec. 19, 1916.

Application filed May 1, 1914. Serial No. 835,639.

*To all whom it may concern:*

Be it known that I, NELSON TROYER, a citizen of the United States, residing at Seattle, in the county of King and State of Washington, have invented new and useful Improvements in Can-Heading Machines, of which the following is a specification.

This invention relates to a can heading machine and consists in certain improvements in the construction thereof as will be hereinafter fully described and pointed out in the claims.

The object of the invention, broadly speaking, is to unite a can head with a can body by a process of seaming whereby a close fit is effected without the use of solder, using a continuously and rapidly operating machine to which it is simply necessary to supply the elements of the can.

The invention is illustrated in the accompanying drawings as follows:—

Figure 1:
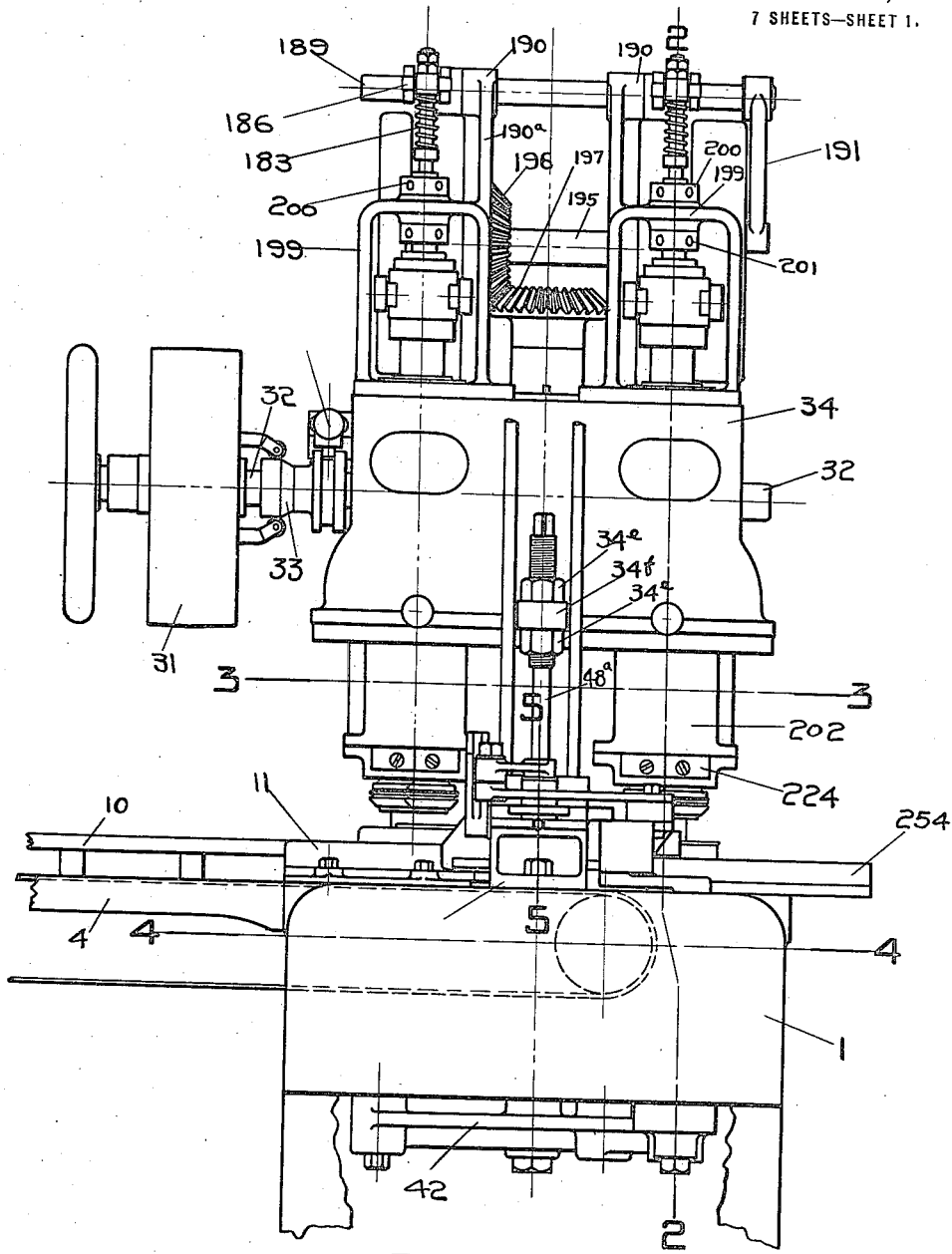
Figure 2:
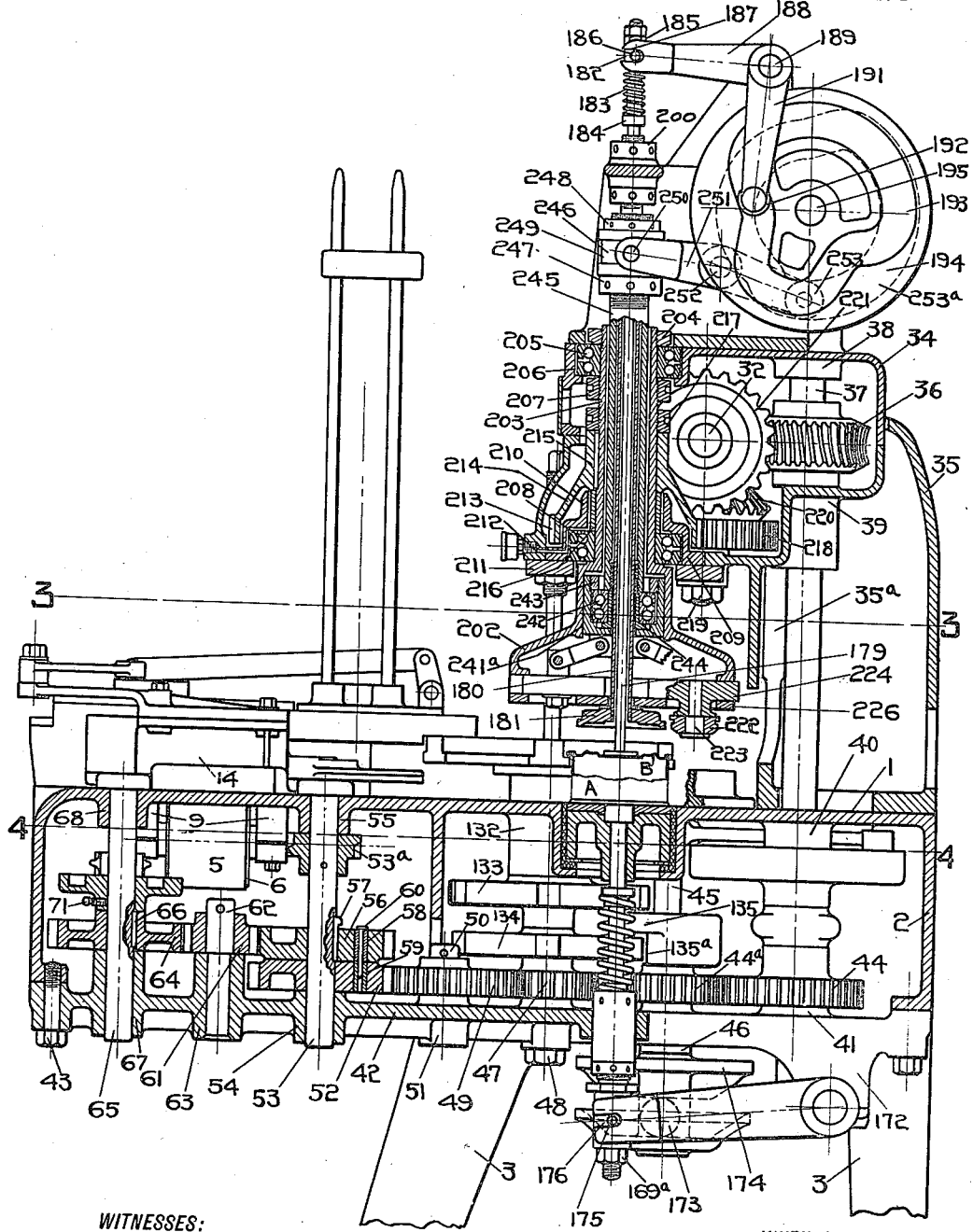
Figure 3:
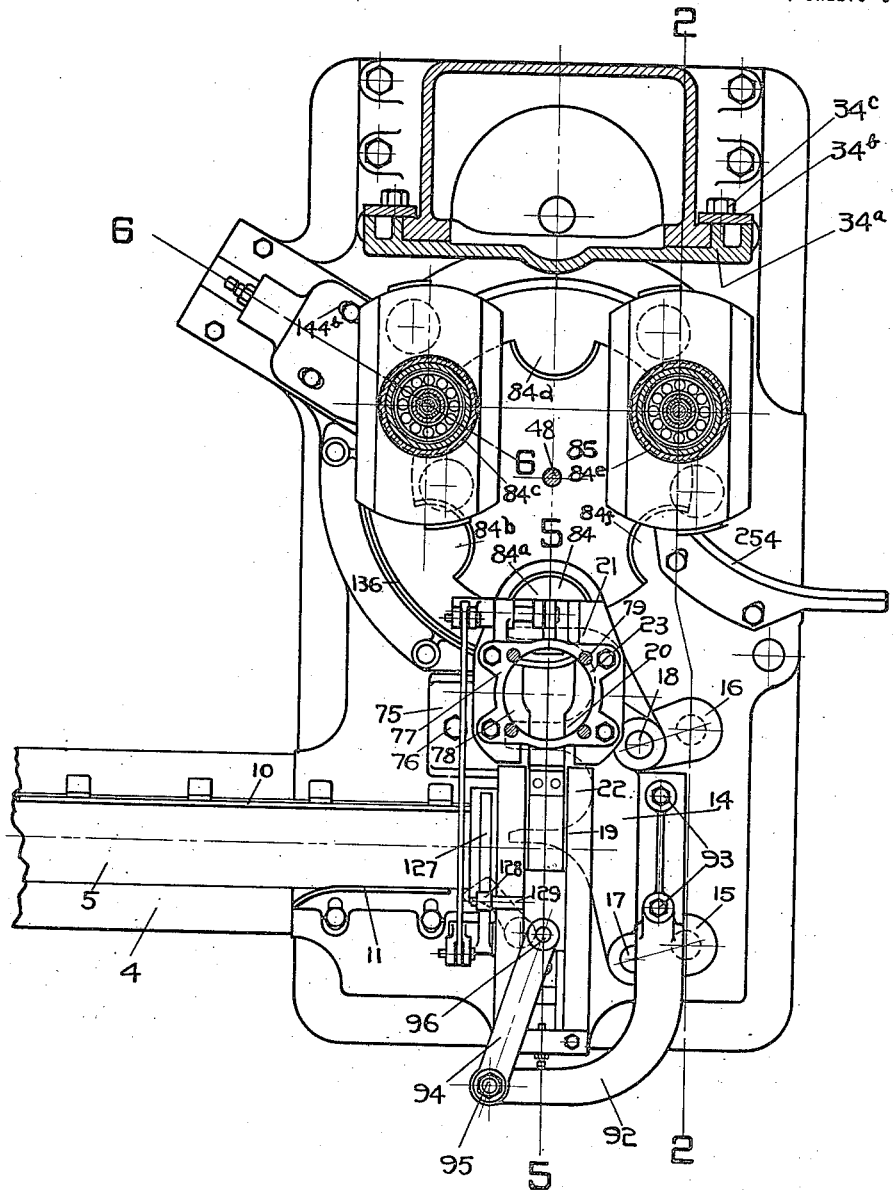
Figure 4:
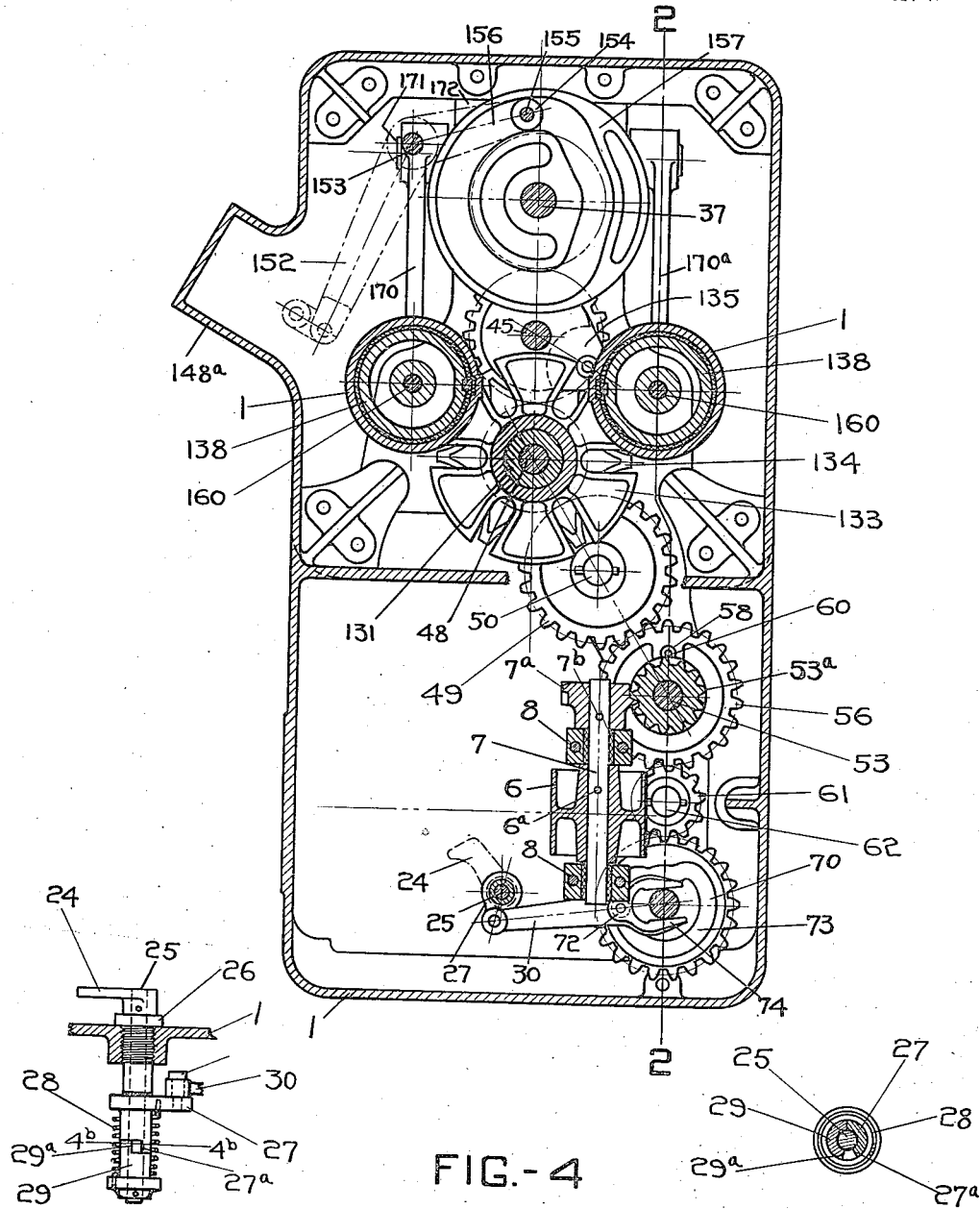
Figure 5:
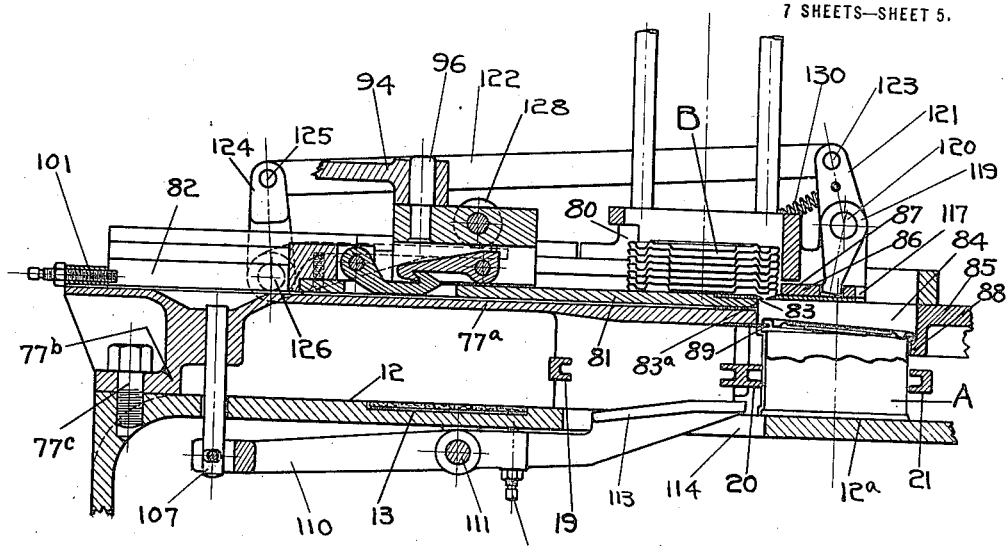
Figure 6:
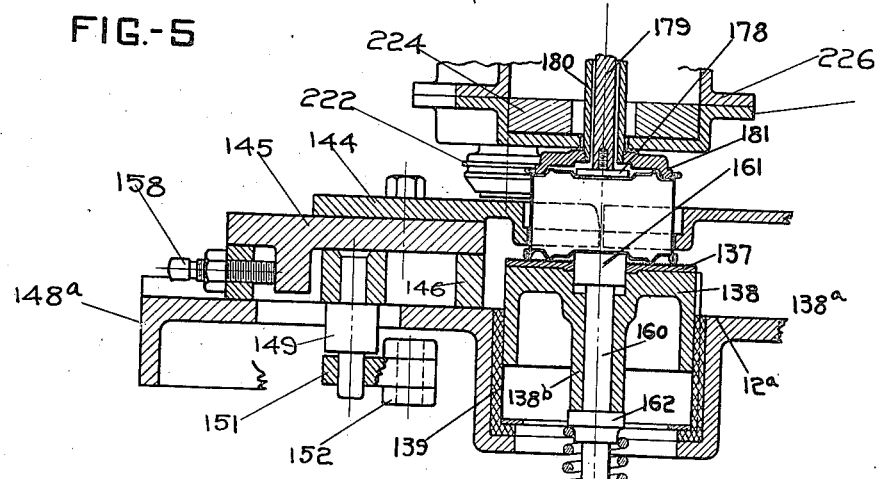
Figure 7:
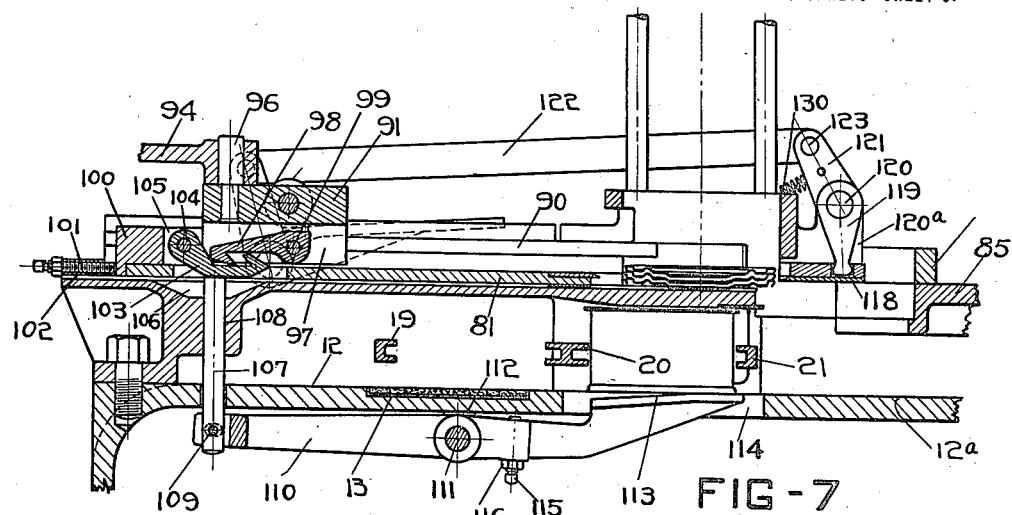
Figure 8:
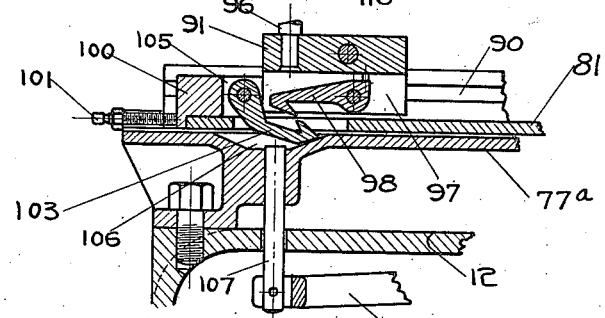
Figures 9, 10:
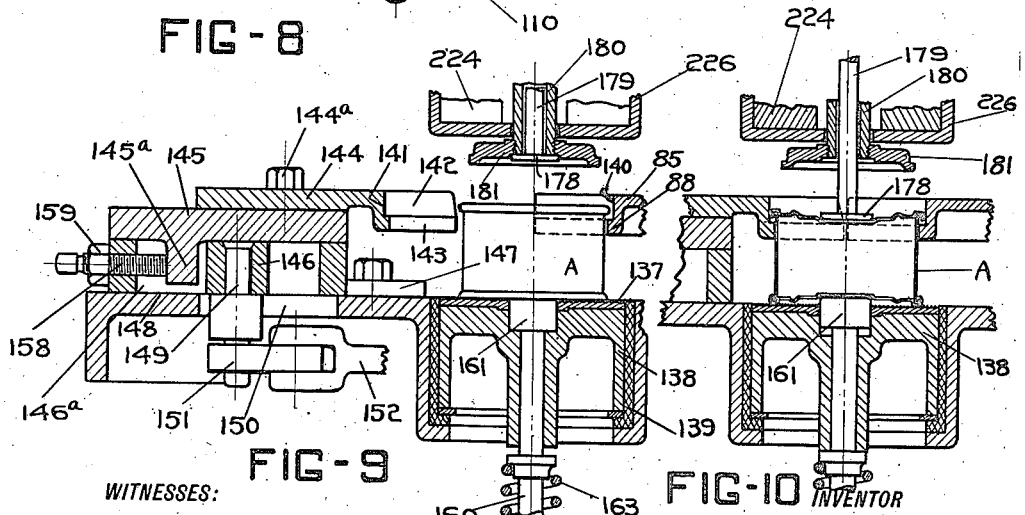
Figure 11:
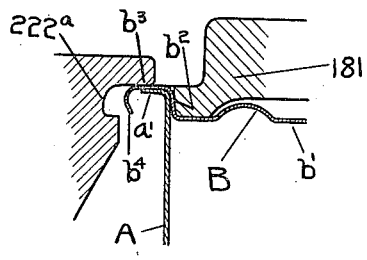
Figure 12:
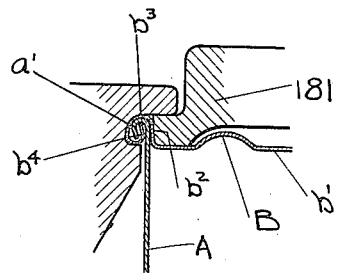
Figure 13:
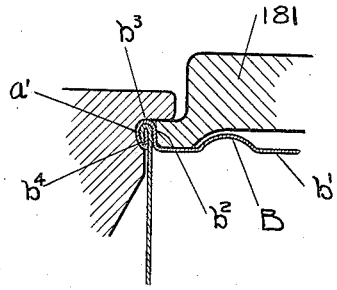
Figure 14:
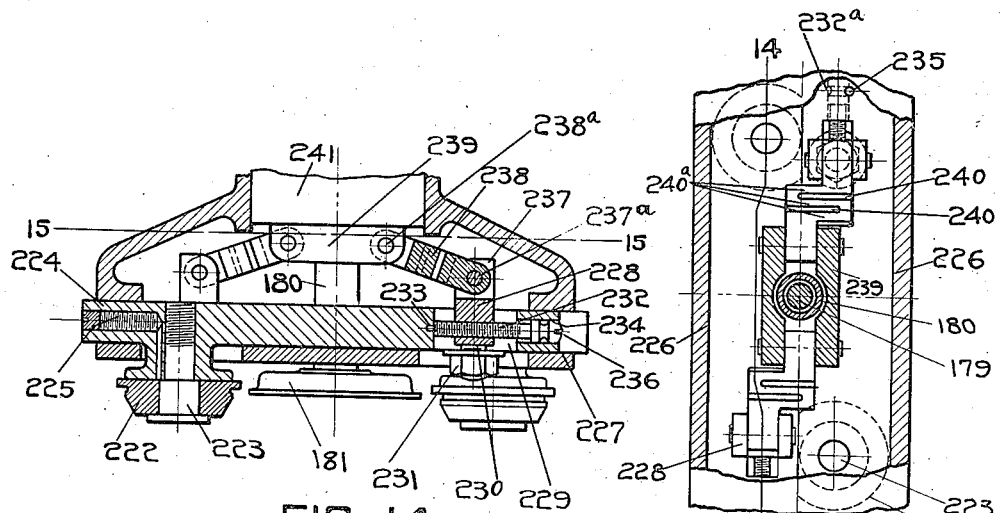
Figure 15:
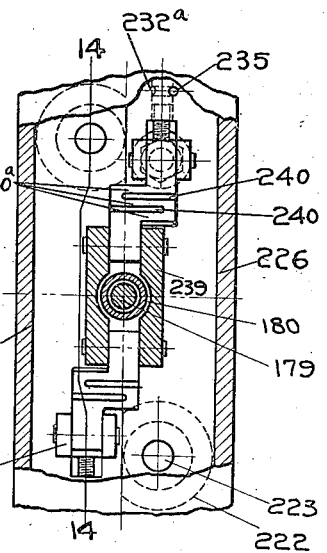

Figure 1 is a front elevation of the machine. Fig. 2 is a section on the lines 2—2 in Figs. 3 and 4. Fig. 3 is a section on the lines 3—3 in Figs. 1 and 2. Fig. 4 is a section on the lines 4—4 in Figs. 1 and 2. Fig. 4ª shows an elevation of a timing finger and parts immediately associated with it. Fig. 4ᵇ is a section on the line 4ᵇ—4ᵇ in Fig. 4ª. Fig. 5 is a section on the line 5—5 in Fig. 3. Fig. 6 is a section on the line 6—6 in Fig. 3. Fig. 7 is a section on the line 5—5 in Fig. 3 showing a different position of parts than that shown in Fig. 5. Fig. 8 is also a section on the line 5—5 in Fig. 3 showing a position of parts differing from Figs. 5 and 7. Fig. 9 is a section on the line 6—6 in Fig. 3. Fig. 10 is a similar section with the parts in a different position than that shown in Figs. 6 and 9. Fig. 11 is a section of a portion of the head chuck and seaming roll prior to the initial operation. Fig. 12 shows the completion of the operation of the first seaming rolls. Fig. 13 is a view showing the second seaming rolls and head chuck with the completed seam. Fig. 14 is a central section through the seaming roll head. Fig. 15 is a section on the line 15—15 in Fig. 14.

The frame is mounted on a base plate 1 which is surrounded by the flange 2. Legs 3 extend from the flange forming the support for the machine. A belt table 4 extends from one side of the frame and the feed belt 5 travels over the belt table, the feed belt running over the pulley 6. The pulley 6 is mounted on a shaft 7 and the shaft is journaled in the bearings 8 carried by the hangers 9 extending from the bottom of the base plate. A guide rail 10 extends along the rear of the feed belt and the guide plate 11 extends a slight distance from the delivery end of the belt.

In the operation of the machine, the can bodies or cans as the case may be are placed in any convenient manner on the feed belt 5 preferably against the guide plate 10. The feed belt operates continuously and carries these bodies or cans toward the delivery end of the belt, any bodies out of alinement being forced into alinement by the guide plate 11. The cans are delivered to a reciprocating feeding mechanism operating from the front to the rear of the machine at right angles to the feed belt. The feed belt carries the can into line with the feed way 12, the feed way having the slot 13 in which the belt runs so that the surface of the belt is flush with the surface of the feed way. A feeding frame 14 is carried by the cranks 15 and 16 through the pins 17 and 18 respectively. These cranks are continuously operated by mechanism hereinafter described and give to the feeding frame a planetary movement. The feeding frame has a series of feeding fingers 19, 20 and 21 forming feeding pockets 22 and 23 (see dotted lines Fig. 3). The can is delivered from the belt 5 into the pocket 22 and with the forward planetary action of the frame is carried forward in the machine or at right angles to the belt and on the second rotation of the frame 14, the can is engaged by the fingers 20 and 21 being received in the pocket 23 and thus moved forward to the position for operation.

In order that the delivery of the cans from the belt to the pocket 22 may be properly timed I provide the following mechanism:—An oscillating finger 24 extends over the belt 5 in position to retard the forward movement of any cans upon the belt just before they reach the pocket 22. The finger 24 is mounted on a shaft 25 extending vertically from the base plate (see Figs. 4 and 4ª) a bearing 26 being arranged in the base plate for the shaft. A rock arm 27 is mounted on the lower end of the shaft with a pivot joint, the joint being provided with the stop 29. A spring 28 is arranged on the shaft below the arm 27 and yieldingly holds the arm against the stop 29. A cam rod 30 is connected with the rock arm 27. The rod 30 is driven by mechanism hereinafter described so as to oscillate the arm 24 with each cycle of the machine. The movement of the arm 24 is so timed that the cans retarded by it on the feed belt are allowed to move forward so as to deliver the leading can to the pocket 22 when the feeding frame has the pocket 22 in position to receive it. By making the driving connection for this arm a yielding one the mutilating of any can body by the retarding finger is prevented. This timing finger prevents the delivery of a can to the pocket or partial delivery of a can to the pocket so as to injure a can by a movement of the finger 19 prior to the time the can has reached a position fully within the pocket.

The feeding mechanism is driven as follows: The entire machine is driven from the pulley 31. This pulley is mounted on the shaft 32 and is adapted to be thrown into and out of engagement with the shaft 32 by a clutch, the setting cam of which is shown at 33. The uprights 35 are secured to the base plate and extend upwardly therefrom. These are provided with the guides 35$^a$ (see Figs. 2 and 3) and the spindle frame 34 is slidingly mounted on these uprights, the spindle frame having the guide plate 34$^a$ which is adapted to slide on the guides 35$^a$. The retaining plate 34$^b$ is secured over the guides 35$^a$ by means of the screws 34$^c$. This adjustable mechanism of the spindle frame permits the spindle and frame as a whole with its mechanism to be adjusted vertically for different heights of cans. The shaft 32 is journaled in bearings (not shown) in the spindle frame and is provided with a worm (not shown) which drives the worm gear 36 (see Fig. 2). The worm gear 36 has a spline and groove connection (not shown) with the shaft 37 so that the spindle frame may be lifted without a corresponding movement of the shaft 37. The shaft 37 is carried by bearings 38 and 39 in the spindle frame and the bearing 40 in the base plate and bearing 41 in the bearing plate 42, the bearing plate being secured to the flange 2 by screws 43. A gear 44 is fixed on the shaft 37. This gear 44 meshes a gear 44$^a$ fixed on a shaft 45. The shaft 45 is carried by a bearing 46 in the base plate. The gear 44$^a$ meshes a gear 47, the gear 47 being journaled on a shaft 48 carried by the base plate and bearing plate. The gear 47 meshes a gear 49. The gear 49 is journaled on a shaft 50 carried by the boss 51 on the base plate. The gear 49 meshes a gear 52, the gear 52 being journaled on a shaft 53. The shaft 53 is carried in bearings 54 and 55 in the bearing plate and base plate respectively. A gear 56 is mounted on the shaft 53 immediately above the gear 52 and is locked with the shaft 53 by a key 57 (see Fig. 2). The gears 56 and 52 are provided with the bushings 58 and 59 which are adapted to be brought into register by rotating the gear 52 on the shaft 53. A locking pin 60 is arranged in the bushing 58 and extends into the bushing 59 so as to lock the gear 56 with the gear 52. Inasmuch as the feeding is all accomplished through the action of the gear 56 if there is an accident to the feeding mechanism and consequent jamming the connection of the driving mechanism to the feeding mechanism will be thrown out by shearing the locking pin 60. The gear 56 meshes a gear 61. The gear 61 is journaled on a pin 62 arranged in the boss 63 in the bearing plate 42. The gear 61 is simply intermediate the gears 56 and 64. The gear 64 is mounted on a shaft 65 and locked against rotation thereon by means of a key 66. The shaft 65 is journaled in the bearings 67 and 68 in the bearing plate and base plate respectively. The cranks 15 and 16 are fixed on the shafts 65 and 53 respectively and are therefore continuously driven through the mechanism just hereinbefore described from the drive pulley 31. These cranks are both driven in the same direction by reason of the introduction of the intermediate gear 61 and are driven together with the crank arms in parallel relation so that the feeding frame 14 is maintained in parallel relation to the feed way.

The cam wheel 70 is fixed by means of a set screw 71 on the shaft 65. A roller 72 is mounted on the cam rod 30 and operates in the cam groove 73. The rod 30 has a forked end 74 the arms of which engage the shaft 65 and so hold the rod in place. The cam groove 73 is so shaped and timed as to throw the timing finger 24 out of engagement with the foremost can on the feeding belt so as to deliver the can properly to the pocket 22. The finger 24 oscillates with each cycle of the machine.

The can heads or covers are stacked in a magazine and delivered automatically to the can bodies or filled cans as they are fed forward by the reciprocating feeding mechanism hereinbefore described. The magazine is mounted on a magazine frame 75. This is secured to the base plate by a bolt 76. The magazine base 77 is secured to the frame 75 and has an opening 78 through which the can heads pass. The guide formed by the opening 78 is continued by four rods 79 which extend upwardly from the base so as to give the magazine any desired capacity. The front face of the base ring has the slot 80 and the selector or plunger 81 is adapted to operate through this slot for disengaging the lowest head or cover from the stack of covers. The plunger operates between the guides 82 and is mounted on the extension 77ª of the magazine frame. The extension 77ª has a foot or support 77ᵇ at its front end which is secured by a screw 77ᶜ to the base plate of the machine. The front end of the plunger 81 is provided with a blade 83 which is adapted to enter between the lowest cover B and the next cover above the lowest cover. With the further forward movement of the plunger, the cover is carried by the shoulder 83ª on the end of the plunger edgewise into a pocket 84 of the turret or can carrier 85. In order to assure the disengagement of the forward end of the cover from the cover immediately above it, I provide an auxiliary plunger 86 with a blade 87 on its forward end which is adapted to enter between the lowest head and the one immediately above it. The blade 86 is beveled and slants upwardly from the front edge so that as it enters between the covers it lifts the stack of covers above the bottom cover or head slightly thus assuring a complete disengagement of the second cover from the lowest. The turret 85 has a shoulder 88 surrounding the pocket 84 so that it may engage a can body independently of the cover thus assuring the fold at the edge of the cover engaging the flange of the can body. The rear end of the head or cover B as it reaches the can body hooks over the flange at the rear of the body and is temporarily supported by a ledge 89 extending from the front end of the magazine extension 77ª as clearly shown in Fig. 5.

It is desirable that the feeding of the can head or cover be controlled by the feeding action of the can body or can. This is particularly true in that it is desirable to deposit the filled cans as filled on the feeding belt and without particular regard to keeping the feeding belt filled at all times. The mechanism for accomplishing this and also the movement of the plungers is as follows:—A guide rib 90 is arranged along the inner surfaces of the guides 82 and the sliding block 91 is slidingly mounted on the ribs 90. An arm 92 is secured by screws 93 to the feeding frame 14. A link 94 is secured to the arm 92 by a pin 95 and to the block 91 by a pin 96. The pin 95 follows the movement of the cranks 15 and 16 and thus gives to the block 91 a continuous reciprocating movement on the guide ribs 90. The block 91 has a slot 97 on its underside and the hook latch 98 is pivotally mounted on the pin 99 in the slot 97. A block 100 is secured to the end of the plunger 81. The rearward movement of the plunger 81 is limited by a screw 101 extending through an ear 102 on the extension 77ª. A hook latch 103 adapted to engage the hook latch 98 is pivotally mounted on a pin 104 arranged in a slot 105 in the front end of the block 100. The support or foot 77ᵇ of the extension 77ª has a depression 106 into which the hook latch 103 may drop and when in this position the hook latch 103 is out of the path of the hook of the latch 98 so that the reciprocation of the block 91 with its latch 98 effects no movement of the plunger 81. When, however, the hook latch 103 is lifted from the depression 106 the hook of the latch 103 is in the path of the hook of the latch 98 and under these conditions the plunger 81 is carried forward with the reciprocating block 91 so as to disengage and feed a head or cover. The plunger is returned by the engagement of the block 91 with the block 100.

In order to operate the latch 103 automatically through the action of the can, the following mechanism is provided:—A push pin 107 extends through the perforation 108 in the support 77ᵇ. This pin extends through the base plate of the machine and especially to that part of the base plate forming the feed way 12. The pin 107 is attached by a pin and slot connection 109 to a lever 110. The lever is mounted on the shaft 111 carried by the ears 112 extending from the base plate 1. The forward end of the lever has a cam surface 113 which projects through an opening 114 in the base plate so that when the inner end of the lever is lifted as shown in Fig. 5 the front end of the cam surface 113 is flush with the surface of the feed way 12 but the rear end of said surface 113 is above the surface of the feed way 12. The position of the surface 113 may be accurately adjusted by the screw 115 which extends through the lever in position to engage the bottom of the plate 1, the screw being locked in adjustment by a jam nut 116. As the can is fed forward by the feed frame 14 it engages the cam surface 113 and forces the front end of the lever 110 downwardly lifting the pin 107 and thus lifting the latch 103 into the path of the latch 98. Under these conditions there is a feeding movement of one of the heads or covers. It will be observed that this feeding movement carrying forward one of the covers or heads can only take place when the lever 110 is operated having a can body or can over it. Where an unfilled can body alone is used, it is desirable to have the surface of the extension 77ª above the surface 113 so spaced as to compel a movement of the lever due to the restricted space for the reason that the can body in itself will not have sufficient weight to operate the lever. Where filled cans are being operated on this space may be somewhat larger and the weight of the filled can will be ample to operate the lever so as to affect the feeding action.

The auxiliary plunger 86 is carried in the guide way 117 in the magazine frame. The plunger has an opening 118 through it into which the end of the rock arm 119 extends. The rock arm 119 is fixed on a shaft 120. The shaft is journaled in ears 120ª extending upwardly from the magazine frame. A rock arm 121 is fixed on the end of the shaft 120 and the link 122 is connected to the rock arm 121 by a pin 123. The opposite end of the link is connected with a bell crank lever 124 by a pin 125. The bell crank lever is journaled on a shaft 126 (see dotted lines Figs. 5 and 7). The lower end of the rock arm 124 has a cam surface 127 which is in the path of a roller 128 carried by a pin 129 (see Fig. 3) extending from the block 91. The roller acting on the cam surface 127 depresses the lower arm of the bell crank lever thus swinging the upper arm forward and rocking the rock arm 119 thus crowding the auxiliary plunger 86 forward with each cycle of the machine. The plunger and rock arm are returned by a spring 130 which is arranged between the rock lever 121 and the base of the magazine.

The turret 85 has six pockets 84 and the turret is given an intermittent movement making one-sixth of a revolution with each cycle of the machine. The pockets 84 are carried from the position $a$ which receives the can from the feeding mechanism and successively to the positions $b$, $c$, $d$, $e$, $f$. The turret is mounted on a sleeve 131, the sleeve being arranged on the shaft 48 and journaled in a bearing 132 in the base plate. The turret receives its motion through a Geneva movement. The drive wheel of the Geneva movement is mounted on the sleeve 131 and the locking wheel 134 of the movement is also fixed on this sleeve. The drive wheel of the movement receives its motion from a crank 135 and the locking surface 135ª forms the hub of the crank and operates in connection with the locking wheel 134. The crank is fixed on the shaft 45 and is driven with that shaft making one revolution with each cycle of the machine. The Geneva movement is arranged to advance the turret one-sixth of a revolution with each cycle of the machine. The first movement of the turret after receiving the can in the position $a$ carries the can to the position $b$. The can is carried on a platform 12ª, the platform being a continuation of the feed way 12 and the can is kept on this platform by a guide 136.

With the first cycle of the machine after the can is received by the pocket 84 at $a$ the can is carried to the position $b$. No operation takes place here. This may be termed an idle position. With the next cycle of the machine the can is carried to position $c$ where the first seaming operation is performed and then to the position $d$ which is an idle one, and then to position $e$ where the final seaming operation is performed. After the completion of this second seaming operation, the can is delivered from the machine, the position $f$ being an idle position. The seaming and spindle mechanism for the first and second operations are identical and are operated by the same mechanism. I have therefore, applied the same reference letters to both spindles and the parts connected therewith, the only difference being that with the spindle of the first seaming operation the can is held in a mold whereas this is dispensed with in the second.

The seaming mechanisms are as follows: The can is carried as it enters the position $c$ and $e$ on to a pad 137. The pad is carried by a plunger 138. The plunger operates in a socket 139. In order to accurately position and center the cans for the initial seaming operation, I have provided a clamp or form which supplements the pocket 84 so as to entirely surround the can body. The shoulder 88 forms an annular groove 140 in the pocket. A mold 141 supplements the pocket and has a groove 142 corresponding to the groove 140 and a shoulder 143 corresponding to the shoulder 88. The mold 141 is carried by a plate 144 and this is secured to a plate 145 in any convenient manner (not shown). The plates 144 and 145 are secured to a block 146 by means of screws 144ª. The block 146 is slidingly mounted between guide plates on a frame 148, the frame being secured to an extension 148ª on the base plate. The block 146 is reciprocated with each cycle of the machine. The connection with the driving mechanism is as follows: A pin 149 extends downwardly from the block 146 through a slot 150 in the frame 148. A link 151 connects the pin 149 with a bell crank lever 152. The lever is shown in dashed lines in Fig. 4 and is journaled on a pin 153 extending from the base plate. A roller 154 is mounted on a pin 155, the pin extending from the arm of the lever 152 opposite the link 151. The roller 154 operates in a cam slot 156 in a cam wheel 157. The cam wheel is fixed on the shaft 37 and makes one rotation with each cycle of the machine. The plate 145 has a lug 145ª which extends into an opening 146ª in the block 146. An adjusting screw 158 extends through the outer periphery of the block 146 and into contact with the lug 145ª. This screw can be locked in adjustment by a jam nut 159. In this way the plate 145 and with it the plate 144 may be adjusted, the opening for the screw 144ª being through a slot 144ᵇ to permit of this adjustment. With each cycle of the machine, the block 146 is moved forward carrying with it the mold 141 so that the can body is entirely surrounded by the shoulders 88 and 143, the cover and the flange of the can being in the grooves 140 and 142. This movement of the mold is so timed that it is completed in the first part of the cycle of the machine after the can has reached the position on the platform. With the can in this position and so centered and held the can is moved axially so as to bring the head in position for the seaming operation. In this machine this is accomplished by lifting the can bodily to a position between the seaming rolls. The plunger 138 is arranged on a pin 160, the plunger having the hollow stem 138$^b$ through which the pin 160 extends. The pin has an auxiliary bottom supporting pad 161. This is adapted to be raised initially above the plunger so as to be brought into contact with the bottom of the can near its center especially where a can has a dished bottom. A shoulder 162 is arranged on the pin 160 and is so distanced from the auxiliary pad 161 as to permit of the necessary movement of the pin 160 in the stem 138$^b$ to bring the pad 161 into contact with the bottom of the can when the shoulder 162 contacts the stem 138$^b$.
In lifting the pad 137 into contact with the holding devices above, it is desirable that this be done with a yielding pressure. A spring 163 is arranged around the stem 138 and against the shoulder 162 and the collar
164. The collar 164 extends through a perforation 165 in the bearing plate 42 (see Figs. 6 and 2). An adjusting screw 166 extends into a screw threaded socket 167 in the bottom of the collar 164. This screw can be locked in adjustment by the jam nut 168. A collar 169 is arranged below the screw 166 on the pin 160 and is secured on the stem by means of a nut 169$^a$ on the bottom of the pin 160. The levers 170 and 170$^a$ operate the plungers for the first and second seaming operations. These levers are fixed on a shaft 171 carried by the ears or lugs 172 extending from the bearing plate. A roller 173 (see dotted lines Fig. 2) is operated by a cam 174, the cam having a peripheral slot engaging the roller so as to operate the levers in both directions. The cam 174 is mounted on the shaft 45 and is given one rotation with each cycle of the machine. The levers have the forked ends which extend around the collars 169, the levers being provided with the slots 176 in which are arranged the pins 175, the pins extending from the collars 169. The operation of this mechanism and timing is as follows: As soon as the mold 141 is moved forward into position centering the can, the auxiliary bottom pad 161 is moved up into contact with the bottom of the can and on the further upward movement of the pin 160 through the influence of the levers operated by the cam 174 the pad 137 is lifted carrying with it the can to the position shown in Fig. 6. The upward pressure is a yielding one which may be regulated by adjusting the collar 164 so as to vary the tension of the spring.

The mechanisms operating on the top of the can are as follows: Prior to the upward movement of the can the top of the can is forced down into position. This operation is particularly necessary when the machine is operating on filled cans. Before any upward movement of the can, therefore, the top pad 178 is lowered and contacts the center of the cover and forces it down into position on the top of the can body. This top pad is carried by a stem 179 which extends through a hollow stem 180 carrying the chuck 181. The chuck is so positioned and of such size that it engages the can head near its periphery and forms a backing for the edge of the can head to support it as it is operated upon by the seaming rolls. The can head as operated on by this machine has a depressed center $b'$ (see Fig. 11), a peripheral shoulder $b^2$ against which the edge of the chuck operates, a lip $b^3$ extending outwardly from its shoulder and a turned-in edge $b^4$ shaped to start the seam. The can body A has an outwardly extending horizontal flange $a'$. The shoulder $b^2$ enters the can body and the lip $b^3$ rests on the flange $a'$ as the initial position of the parts.
The seaming operation will be later described. The upper end of the stem 179 is provided with a collar 182. This collar rests on a spring 183 surrounding the stem, the spring resting on a shoulder 184. The collar is held in place by a nut 185 at the upper end of the stem. Pins 186 extend through the stem into the slots 187 in the end of the rock arm 188. The rock arm is mounted on a shaft 189 (there is one rock arm for each spindle). The rock arm is journaled in a bearing 190 on a post 190$^a$, the post extending upwardly from the frame 34. The rock arm 191 is fixed on the end of the shaft 189. The end of this rock arm is provided with a roller 192 (see Fig. 2) which operates in a cam slot 193 in a cam wheel 194. The cam wheel 194 is fixed on a shaft 195, the shaft being journaled in bearings (not shown) in the posts 190$^a$. A beveled gear 196 is fixed on the shaft 195 and meshes a gear 197. The gear 197 is fixed on a shaft 37 and the gears are so arranged that the shaft 195 is given one rotation with each cycle of the machine. The cam slot 193 is such as to force the top pad 178 down in the early part of the cycle so as to force the cover or head into position on the can. As soon as the mold has engaged the can body and as the can is moved bodily by the plunger 138 the top pad 178 is retracted, the retracting movement being timed and regulated so that the cover is firmly held in place during the upward movement of the can yet the upward movement of the can is not interfered with.

The stem 180 carrying the chuck 181 extends upwardly around the stem 179 and is secured in a yoke 199 extending across the top of the frame from the post 190ª. Nuts 200 and 201 are arranged on the stem 180 at each side of the yoke and by means of these nuts the height of the chuck may be accurately adjusted and the stem secured in adjustment. The head 202 is carried by a sleeve 203. The upper end of this sleeve is screw threaded and the nut 204 is run on to the upper end of the sleeve resting on a ball bearing 205, the ball bearing being arranged in a socket 206 in the top of the spindle frame 34. An adjusting nut 207 is arranged below the ball bearing on the sleeve 203. The ball bearing 208 is arranged near the bottom of the sleeve, the ball bearing being in a pocket arranged in the underside of a closure plate 209. This closure plate has the upwardly extending lip 210 forming the inner wall of the well in the gear frame 34 for retaining oil in the spindle frame. A plate 211 is arranged below the closure plate 209 and is secured to the bottom of the frame 34. The closure plate 209 fills an opening large enough to allow the assembling of the parts within the spindle frame. An oil opening 212 extends through the parts to the ball bearing 208. A gear 213 is provided with a skirt 214 which extends around the flange 210 and forms a web supporting the gear on the hub 215, the hub being keyed on the sleeve 203. A distance piece 216 is arranged between the hub 215 and the ball bearing 208 and a nut 217 is arranged on the sleeve 203 above the hub 215. The gear 213 meshes a gear 218. The gear 218 is carried by an upright shaft 219 secured in the bottom of the frame 34. A beveled gear 220 is fixed on the shaft 219 and meshes a gear 221, the gear 221 being on the shaft 32. In this way the head 203 is constantly rotated. The oil in the bottom of the well formed by the gear chamber frame 34 is retained by the flange 210. The head is mounted in ball bearings so as to run smoothly.

The seaming rolls 222 are mounted on pins 223. The pins 223 are carried by the slides 224 (see Figs. 2, 14 and 15), the pins 223 being screwed into the slides. The oil opening 225 extends from the end of the slides. The slides are arranged side by side and in contact with the head, the head having the guide surfaces 226 at each side of the slides. The slides extend through perforations or slots 227 at the ends of the head. Blocks 228 extend into slots 229 in the slides, there being one block for each slide. These blocks have the screw threaded extensions 230 which extend through the slides and the blocks are clamped in position by nuts 231 on the extensions 230, the blocks being of sufficient width at the top to form a shoulder engaging the top surface of the slide. Screws 232 extend through the blocks 228, one end of the screw having a swivel connection 233 with the block at the inner end of the slot 229. The screw head extends through a perforation 234 in the outer end of the block, the screw being provided with a locking groove 232ª. A locking pin 235 extends through the block and into the groove 232ª thus locking the screw against axial movement. The screw heads are provided with the slots 236 so that they may be readily turned by means of a screw driver, or similar device. In this way, the blocks 238 may be readily adjusted thus nicely adjusting the seaming rolls to the size of the can. The upper parts of the blocks are slotted at 237 and extending to each block is a toggle link 238, the toggle link being connected with the block by a pin 237ª. The opposite end of each link is connected by a pin 238ª with a head 239. It will be readily seen that as the head 239 is depressed, the blocks 228 are forced outwardly carrying with them the slide to which they are connected. It will be observed that this outward movement of the block 228 results in an inward movement of the seaming roll carried by the same slide, as the seaming roll is located at the opposite side of the head. It will be further observed that these slides have a long bearing still they occupy but a small space and the slides have a similar movement in and out at all times equal so that the balance of the head is maintained in all positions.

It is desirable that a yielding pressure be delivered to the seaming rolls so that any slight variation in can bodies or heads may be provided for and at the same time sufficient pressure be delivered to form the seam. I have provided a simple spring for this purpose by forming slots 240 from opposite faces of the toggle levers, the slots lapping past each other and forming spring sections 240ª. While these spring sections have sufficient rigidity to give to the seaming rolls a positive movement in both directions under normal conditions, yet they are sufficiently resilient to yield under inequalities in the cans or to provide for slight discrepancies in the adjustments.

The head 239 is carried by a plunger 241 arranged in a socket 241ª in the top of the head. The ball bearing 242 is arranged within the plunger being locked in place by a nut 243. The inner member 244 of the ball bearing is carried by a sleeve 245 extending up through the sleeve 203. A collar 246 is secured between the nuts 247 and 248 which are screwed on to the top of the sleeve 245. The collar has the grooves 249 one at each side into which the pins 250 extend. The pins are carried by a lever 251. The lever is mounted on a shaft 252 carried by a bearing (not shown) extending upwardly from the gear frame 34. A roller 253 (see dotted lines Fig. 2) is arranged on the end of the lever 251 and operates in a cam slot 253$^a$ on the opposite side of the cam wheel 194 from the slot 193. The cam slot is so shaped as to give to the lever 251 a movement depressing the sleeve 245 at proper time to move the seaming rolls into contact with the edge of the head when the can is brought into position and clamped against the chuck. This movement of the seaming rolls follows the upward movement of the can and this movement is so timed that the rolls are brought into engagement immediately the can reaches this position. The rotation of the head with the seaming rolls in this position forms the seam, the first seaming rolls at position $b^c$ giving it the initial shape and the second seaming rolls at position $e$ completing it. It will be observed that the sleeve 245 extends up through the rotating sleeve 203 but is spaced from said sleeve 203 so there is no frictional contact with the rotating head or sleeve except with the ball bearings 242.

The details of the seam as it is formed are shown in Figs. 11, 12 and 13. In Fig. 11, the position of the seaming rolls is shown as they are approaching the edge of the head, the head and can being in the upper position, the edge of the chuck engaging the shoulder $b^2$. In Fig. 12 the condition of the seam is shown at the completion of the first seaming operation. Here the edges are interlocked and the seam formed. In Fig. 13 the seam is shown at the completion of the second seaming operation. Here the folds of the seam are brought into such intimate contact as to hermetically seal the can without the use of solder.

At the completion of the second seaming operation at the position $e$ as the turret is advanced the can engages an ejecting guide 254. The forward movement of the turret brings the can into engagement with this guide and the forward movement of the turret moves the can along the guide outwardly clear of the pocket 84.

It will be noted that the frame 34 may be moved bodily to adjust the roll carrying head for different heights of cans and that this adjustment does not change the adjustment of the parts because the entire mechanism is carried with it. The shaft 48 extends through the sleeve 131 and upwardly to a position opposite the frame 34. The upper end of this shaft is screw threaded and extends through an ear 34$^f$ on the frame 34. The nuts 34$^e$ are arranged at each side of the ear so that the position of the frame may be adjusted and so supported.

The general operation of the machine leaving out the details of mechanism which have been heretofore described for accomplishing each operation is as follows: The cans are delivered to the feeding belt 5 and are carried by the feeding belt to the reciprocating feeding frame. Just prior to reaching the reciprocating feeding frame the cans are retarded by the timing finger 24 so that the cans are properly delivered to the reciprocating feeding frame. The feed belt runs across the front of the machine and the cans are carried from it forward over the feed way by the reciprocating feeding mechanism to a position in a pocket in the turret. As the can moves forward it engages the controlling lever 110 and throws the latch in the head feeding the plunger into engagement with its actuating mechanism. The head feeding plunger then moves forward with the can feeding mechanism carrying the head with it and delivering it to the pocket in the turret as the can reaches this pocket. The can head is positively separated from the other heads or covers carried in the magazine by the auxiliary blade which separates the forward edge of the lowest cover from the next above lifting the pack of covers or heads slightly to accomplish this result. With the can in the pocket in the turret and the head in place thereon the turret is advanced bringing the can under the first seaming spindle. Here the pocket in the turret is supplemented by a half mold which entirely envelops the entire periphery of the can. The top pad is depressed forcing the cover into position on the top of the can. This is particularly desirable with filled cans if the material in the cans tend to hold the cover above the top. The auxiliary supporting pad is lifted engaging the center of the bottom and supporting it, then the bottom pad with its plunger is raised lifting the can bodily thus supported to a position against the chuck, the top pad retracting with the upward movement of the can and being synchronized so as to hold the cover in position during this upward movement. The can with its head is clamped against the chuck with a yielding pressure through a yielding connection with the mechanism actuating the plunger. With the can in this position, the seaming rolls are brought into engagement with the edge of the cover and the seam formed. The seaming rolls are then drawn out to their normal position and the can dropped to its lower position through a downward movement of the supporting plunger. The bottom auxiliary supporting pad is retracted so as to bring it flush with the surface of the bottom pad and the mold is retracted so as to leave the path clear for the advancing can. The turret is then advanced carrying the can to the second spindle where the seaming operation is repeated, the seaming mechanism and parts actuating the can being exactly similar to that of the first seaming operation except that no mold for the can body is used inasmuch as the initial seam supports the body so as to make this unnecessary. The can is then ejected from the machine. It will be understood that in the normal operation of the machine there will be a can in each pocket of the turret and that the initial seaming operation and the final seaming operation will be simultaneously performed on different cans.

It will be noted that the chuck 181 is mounted on the spindle 180, the spindle being of comparatively small diameter and the chuck arranged at a point remote from the point of support of the spindle. This forms a yielding mounting for the chuck permitting the chuck to move radially slightly to accommodate itself to any inaccuracies in the alinement or centering of the seaming rolls 222.

What I claim as new is:—

1. In a can heading machine, the combination of a feed belt adapted to feed can bodies; a reciprocating feed mechanism having a pocket to which the bodies are delivered by the belt; a timing device comprising a finger; a shaft on which the finger is mounted; a rock arm for oscillating the shaft and finger; a spring connection between the rock arm and shaft; and a cam for actuating the rock arm, said cam timing the movement of the rock arm and finger to retard the bodies on the belt and to time them with relation to the reciprocating feed mechanism.

2. In a can heading machine, the combination of a body feeding mechanism; a cover magazine; and selecting devices one of which feeds the cover edgewise comprising reciprocating blades entering between the bottom cover and the next above it at front and rear of the cover to separate the bottom cover from the pack in the magazine.

3. In a can heading machine, the combination of a body feeding mechanism; a cover magazine; and selecting devices comprising reciprocating blades entering between the bottom cover and the next above it at the front and rear of the cover, lifting the covers above the bottom away from the bottom cover one of the said devices moving the bottom cover to a can body.

4. In a can heading machine, the combination of a body feeding mechanism; a cover magazine; and selecting devices comprising reciprocating blades entering between the bottom cover and the next above it at front and rear of the cover, lifting the covers above the bottom away from the bottom cover one of said devices moving the bottom cover edgewise into position on a can body.

5. In a can heading machine, the combination of a body feeding mechanism; a cover magazine; a selecting device comprising a plunger carrying a blade adapted to enter between the lowest cover and the next above it at the rear edge of the cover; means continuing the movement of the plunger to carry the cover separated from the pack edgewise into place on a can body; and an auxiliary plunger carrying a separating blade entering between the lowest cover and the cover above it and lifting the covers above to disengage them from the lowest cover.

6. In a can heading machine, the combination of a body feeding mechanism; a cover magazine; a selecting device comprising a main plunger; means for moving the main plunger to select a cover and continuing the movement of the plunger to move a cover edgewise; an auxiliary plunger carrying a separating blade entering between the lowest cover and the next above it at a point opposite the main plunger to disengage the lowest cover; and mechanism actuating the auxiliary plunger.

7. In a can heading machine, the combination of a cover magazine; a selecting plunger having a blade adapted to enter between the lowest cover and the next above it, said plunger adapted to carry said cover edgewise for delivery; an auxiliary plunger having a blade operating on the can cover opposite the selecting plunger and adapted to disengage the lowest cover from the next above it; and means for actuating said plungers.

8. In a can heading machine, the combination of a body feeding mechanism; a cover magazine; a selecting mechanism for selecting a cover from the magazine and delivering it to the can body; and a ledge for automatically holding one edge of the cover as the cover is delivered to the body above the body with the opposite edge of the cover in place.

9. In a can heading machine, the combination of a body feeding mechanism; a cover magazine; a selecting mechanism for selecting a cover from the magazine and delivering it to the can body; and a ledge for holding the rear edge of the cover above the body with the opposite edge in place on the can as the cover is delivered.

10. In a can heading machine, the combination of a carrier for can bodies, said carrier having a pocket formed to receive a can body and cover in place thereon; means for intermittently actuating the carrier; a mold formed to receive a can body and cover in place thereon supplementing the pocket on the carrier; means for intermittently actuating the mold to close on a body and cover in the pocket; and a heading device concentric with a can held by said mold for assembling the cover and body.

11. In a can heading machine, the combination of a turret having a series of pockets therein adapted to receive a can body and cover; a mold adapted to supplement the pocket; means for intermittently advancing the turret and for intermittently actuating the mold to envelop a body and cover in a pocket; and seaming mechanism adapted to seam the cover and body while the body is engaged by the mold.

12. In a can heading machine, the combination of a turret having a series of pockets therein adapted to receive a can body and cover; a mold adapted to supplement the pocket in centering the can body and cover; means for intermittently advancing the turret and for intermittently actuating the mold to envelop the can body and cover in the pocket; means for elevating the can and cover so as to clear the cover from the pocket; and seaming mechanism adapted to seam the cover and body while the body is engaged by the mold.

13. In a can heading machine, the combination of a plunger on which a can may be supported; means for centering the can on the plunger; a chuck above the plunger; an auxiliary pad adapted to operate on the cover to force it into engagement with the can; means for actuating the plunger to lift the can bodily and to bring the cover into engagement with the chuck; a seaming device operating upon the cover and body while in engagement with the chuck; and devices enveloping the body and cover before the can is lifted and the periphery of the body during the seaming operation.

14. In a can heading machine, the combination of a carrier having a series of pockets adapted to receive can bodies with covers; a mold supplementing the pocket for enveloping the can; a plunger on to which the can is carried by the carrier, said plunger being adapted to lift the can bodily while enveloped by the pocket and mold; a chuck adapted to engage a can cover as the can is lifted; and seaming devices for uniting the can body and cover while held in position on the chuck.

15. In a can heading machine, the combination of a turret having a series of pockets adapted to receive can bodies with covers; a mold for supplementing the pocket; means for intermittently advancing the turret and actuating the mold to envelop a body and cover; a plunger on to which the can is carried by the turret and adapted to lift the can bodily in the pocket and mold; an auxiliary pad adapted to force the cover into position on the can and to be retracted as the can is lifted; a chuck against which the cover is forced by the plunger; and a seaming mechanism operating on the edge of the cover as the cover is in position on the chuck.

16. In a can heading machine, the combination of a plunger on which the can rests; an auxiliary supporting pad carried within the periphery of the plunger; means for actuating the plunger and auxiliary pad with the auxiliary pad in advance of the plunger and for operating the auxiliary pad and plunger together to lift the can; a chuck against which the cover on the can is lifted by the plunger; and means for closing the can by seaming the cover with the cover in engagement with the chuck.

17. In a can heading machine, the combination of a plunger on which the can rests; an auxiliary supporting pad arranged to operate within the periphery of the plunger; means for actuating the auxiliary pad in advance of the plunger to engage a dished bottom; a top pad adapted to force the cover into engagement with the can body; means for lifting the plunger and auxiliary pad while the top pad is retracted; a chuck against which the top cover is forced; and seaming devices operating upon the top cover as it is in engagement with the chuck.

18. In a can heading machine, the combination of a pocket in which the can is arranged; a plunger on which the can rests; a mold acting with the pocket for enveloping the can; an auxiliary pad operating with the plunger and adapted to be brought into engagement with the center of the bottom cover; an upper pad adapted to be brought into engagement with the upper cover and to force the same into position on the can body; means for lifting the lower plunger to raise the can bodily; a chuck against which the upper cover is forced; and means for seaming the edge of the upper cover while in engagement with the chuck.

19. In a can heading machine, the combination of a turret having a series of pockets therein; a plunger to which the can is carried by the turret; an auxiliary supporting pad on the plunger; means for initially moving the auxiliary supporting pad into engagement with the bottom of the can; a top pad adapted to force the top cover into engagement with the can; means for operating the plunger to lift the can bodily; a chuck against which the upper cover is forced by the action of the plunger; and a seaming device for seaming the edge of the top cover while in engagement with the chuck.

20. In a can heading machine, the combination of a turret having a series of pockets; a plunger on to which the can is carried by the turret; a mold supplementing the pocket and enveloping the can body; an auxiliary pad on the plunger adapted to move relatively to the plunger to engage the surface of the bottom cover; a top pad for forcing the top cover into engagement with the can; means for actuating the plunger to lift the can bodily; a chuck against which the top cover is forced by the lifting movement of the plunger; and means for seaming the top cover while said cover is in engagement with the chuck.

21. In a can heading machine, the combination of a turret having a series of pockets adapted to receive a can and cover; a mold supplementing the turret for enveloping the can body and cover; a plunger on to which the can is carried by the turret; means for actuating the plunger to lift the can body while enveloped by the mold and pocket to clear the cover; a chuck against which the upper cover is forced by a lifting movement of the plunger; seaming rolls acting on the edge of the upper cover for forming the seam with the body; and a rotating head actuating said seaming rolls, the plunger carrying the can axially to a position in the plane of the seaming rolls.

22. In a can heading machine, the combination of a seaming roll carrying head; a hollow shaft on which the head is mounted; slides arranged in the head, said slides overlapping each other and adapted to move radially in opposite directions; seaming rolls carried by said slides; and means for actuating said slides.

23. In a can heading machine, the combination of a roll carrying head; a hollow shaft carrying said head; slides arranged in said head, said slides overlapping each other and adapted to move in opposite directions; means extending through said hollow shaft for actuating said slides; and seaming rolls carried by said slides.

24. In a can heading machine, the combination of a roll carrying head; a hollow shaft on which said head is mounted; slides arranged in said head and adapted to move radially therein, said slides overlapping each other; toggle levers for moving said slides in opposite directions; and means extending through the hollow shaft for actuating the toggle levers.

25. In a can heading machine, the combination of a seaming roll carrying head; roll carrying devices mounted on the head; rolls mounted on said devices; and toggle levers acting on said devices, the toggle levers being slotted alternately from opposite sides forming spring sections for actuating said devices.

26. In a can heading machine, the combination of a seaming roll carrying head; a hollow shaft on which said head is mounted; roll supporting devices carried by the head; rolls mounted on said devices; and means comprising non-rotating mechanism for actuating said devices, said means extending through the hollow shaft.

27. In a can heading machine, the combination of a seaming roll carrying head; a hollow shaft on which said head is mounted; roll supporting devices carried by the head; rolls mounted on said devices; and means comprising non-rotating mechanism for actuating said devices, said means extending through the hollow shaft and spaced from the hollow shaft.

28. In a can heading machine, the combination of a roll bearing head; a sleeve on which said head is mounted; bearings for said sleeve; means for driving the head mounted on the sleeve; roll carrying devices mounted on the head; rolls on said devices; a device actuating sleeve within the sleeve on which the head is mounted for actuating said devices; a chuck against which the can cover may be forced in position to be seamed; a hollow stem forming a support for the chuck arranged within said sleeve; a pad for exerting pressure on the cover; and a support for the pad extending through the stem.

29. In a can heading machine, the combination of a seaming roll carrying head; a shaft on which said head is mounted; a gear mounted on the shaft for driving the same, said gear having a hub and face connected by a skirt, the hub being above the face; and a chamber surrounding the gear and having a flange extending upwardly within the skirt to retain oil on a level to lubricate the gear face.

30. In a can heading machine, the combination of a seaming roll bearing head; means for driving said head; rolls carried by said head; devices on which said rolls are mounted; means for actuating said devices; a frame carrying the mechanism actuating the head and devices; means for moving the frame and actuating mechanism bodily to vary the position of the head for different heights of cans; a turret on which the cans are carried to said head; and supporting means for said frame concentric with the turret.

31. In a can heading machine, the combination of a seaming roll bearing head; a hollow shaft on which the head is mounted; seaming rolls on said head; a chuck on said head; a spindle on which said chuck is mounted, said spindle extending into the hollow shaft and being secured at a point remote from the chuck the spindle being free to move radially with the chuck; and means for actuating the seaming rolls.

In testimony whereof I have hereunto set my hand in the presence of two subscribing witnesses.

NELSON TROYER.

Witnesses:
JOHN FOX,
F. L. BISHOP.